July 24, 1962  B. S. WILDI  3,046,322
THERMOELECTRIC DEVICE

Filed March 7, 1960  2 Sheets-Sheet 1

FIGURE I.

INVENTOR.
BERNARD S. WILDI
BY
Lloyd B. Stevens, Jr.
ATTORNEY

July 24, 1962 B. S. WILDI 3,046,322
THERMOELECTRIC DEVICE
Filed March 7, 1960 2 Sheets-Sheet 2

INVENTOR.
BERNARD S. WILDI

BY Lloyd B. Stevens, Jr.

ATTORNEY 3,046,322
THERMOELECTRIC DEVICE
Bernard S. Wildi, Dayton, Ohio, assignor to Monsanto Chemical Company, St. Louis, Mo., a corporation of Delaware
Filed Mar. 7, 1960, Ser. No. 13,356
11 Claims. (Cl. 136—5)

The invention relates to organic semiconductor thermoelectric devices. More particularly the invention involves pyrolyzed pyromellitonitrile/hydrogen sulfide reaction product bodies or components or elements useful in the thermoelectric devices. These bodies can suitably be in the form of discs, wafers, bars, rods, rectangular parallelepipeds, round, or most any geometric shape.

It is well known in the art to employ certain inorganic materials as thermoelectric components; however, few if any suitable organic materials have previously been known. It has now been discovered that certain other new types of organic materials are useful for this purpose. These materials which are pyrolyzed pyromellitonitrile/hydrogen sulfide reaction products are described in detail in copending application Serial No. 13,355, filed concurrently herewith. The reaction product contains substantially 2 moles of hydrogen sulfide per mole of pyromellitonitrile. The pyrolyzed product is produced by heating the reaction product either in powdered or pelleted form under high vacuum or in the presence of an inert atmosphere at a temperature in the range of about 180–700° C., preferably 300–600° C. The time of heating varies with the temperature and the properties of the product desired and may vary from an hour or less to a number of days.

It is an object of this invention to provide new and useful thermoelectric devices.

It is another object of this invention to provide new and useful thermoelectric devices for generating direct current power.

It is another object of this invention to provide new and useful devices for cooling thermoelectrically.

These and other objects of the invention will become apparent as the detailed description of the invention proceeds.

In making the thermoelectric bodies of the invention, pyromellitonitrile, a new compound described in copending application Serial No. 696,026, filed November 13, 1957, now abandoned, is used.

The invention will be more clearly understood from the following detailed description of specific examples thereof read in conjunction with the accompanying drawings wherein.

EXAMPLE 1

Figure 1:
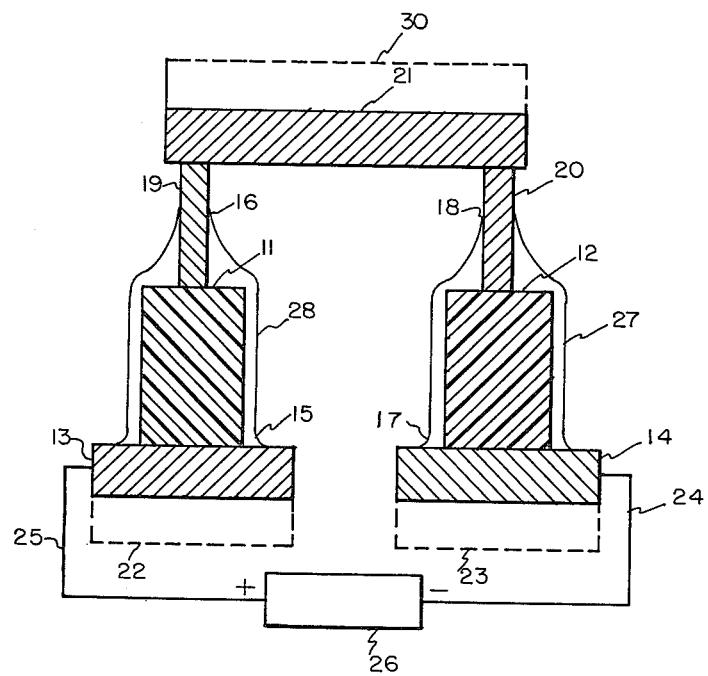
FIGURE 1 is an elevational view partially in section of one embodiment of the invention.

This example describes the preparation of pyromellitonitrile/hydrogen sulfide reaction product prepared in the presence of the base ammonium hydroxide. A sample of 20 g. of pyromellitonitrile, 400 ml. of ethanol and 40 ml. of concentrated (about 28% $NH_3$) ammonium hydroxide were placed in a three-necked 1 liter flask equipped with a stirrer, thermometer, condenser and a gas inlet tube. Then hydrogen sulfide was passed through the mixture in the flask. The contents of the flask turned dark red immediately and all of the material went into solution. The temperature of the reaction mixture went to 35° C. and was maintained at about this temperature by the controlled addition of hydrogen sulfide. After 3½ hours of hydrogen sulfide addition, the addition of hydrogen sulfide was terminated and the reaction mixture was gradually heated to reflux and maintained at reflux temperatures for 1½ hours. Then the reaction mixture was filtered to recover a solid material which was washed with 2 liters of methanol. The dried residue product from the methanol washing was put in a vacuum sublimator for four days at 200° C./0.2 mm. of Hg absolute pressure. The reaction product results from a combination of substantially 2 moles of hydrogen sulfide per mole of pyromellitonitrile with an excess of hydrogen sulfide being used to insure the formation of the desired product. An elemental analysis of the residue product from the vacuum sublimation treatment yielded the following results:

Percent:                                Found
C _____ 55.4
H _____  2.7
N _____ 22.4
S _____ 14.0

EXAMPLE 2

This example describes the preparation of pellets of the reaction product of Example 1, heat treating the pellets and electrical testing thereof. From powdered reaction product of Example 1, two pellets were pressed using a rectangular die 22 x 4.75 mm. and a force of about 20,000 pounds. Prior to pressing the two pellets, the powdered samples were evacuated for 10 minutes at 0.1 mm. of Hg absolute pressure. The pressed pellets were approximately 1 mm. in thickness. The total weight of the two pellets was 0.2410 g. Both pellets were subjected to heat treatment at 520° C./0.2 mm. for 12 hours. Weight of the pellets after heat treatment was 0.1732 g. indicating a 28% weight loss. The resistivity and thermoelectric power was measured on one of the samples. Resistivity was measured under a vacuum of about $10^{-3}$ mm. and was found to be 190 ohm-cm. at room temperature (about 23° C.)

The thermoelectric testing of the sample or pellet was carried out in the following fashion: The pellet to be tested was placed on a gold-plated copper plate which served as a cold (about 23° C.) electrode of the thermoelectric generator. The hot electrode for the generator was a soldering iron having a gold-plated tip which was mounted in a jig and could be raised or lowered by a screw arrangement. Three measurements were taken at different points on the sample and averaged for the thermoelectric power reported. During the measurements the soldering iron was pressed against the upper surface of the sample with sufficient pressure being applied to give good ohmic contact both for the soldering iron and the copper plate with the sample. The series electrical circuit was completed from the gold-plated copper plate through a galvanometer, soldering iron, the sample and back to the copper plate. In the test the hot probe was heated to approximately 100° C. above the temperature of the cold plate before being applied to the pellet being tested. The actual hot probe and cold plate temperatures were measured by thermocouples. For each reading the apparatus was allowed to come to equilibrium and the highest voltage generated was noted. Although the pyrolyzed pellets have very good thermoinsulating powers, if the hot probe is maintained in contact with the sample over a long period of time the cold copper plate tends to approach the temperature of the hot probe due to heat of conduction through the sample. From the thermoelectric test of one heat treated sample a thermoelectric power (TEP) of −24 microvolts/° C. was determined. The negative sign indicates that the sample has N-type conductivity.

A second pellet weighing 0.0674 g. after the heat treatment was placed back in the furnace for further heat treatment at 560° C./0.1–0.2 mm. of Hg absolute pressure for 40 hours. At the end of this heat treatment the sample weighed 0.0616 g. indicating an additional loss of weight of 8.6%. Conductivity and thermoelectric power tests on this sample resulted in a conductivity ($\rho$) of 22 ohm-centimeter and a thermoelectric power (TEP) of $+1.6\mu$ v./°C. Thus it is seen by this additional heat treatment a pyrolyzed pellet was produced which had P-type conductivity. This P-type conductivity can be maximized by optimum treating temperatures and time of treatment.

Heat treated pellets of hydrogen sulfide/pyromellitonitrile reaction products made with or without a base catalyst such as sodium hydroxide or pyridine or other base catalyst exhibit comparable thermoelectric properties to those of the pellets of Example 2 above.

EXAMPLE 3

This example describes the preparation of a number of other pellets from the product of Example 1, the heat treatment and electrical testing thereof. Five separate pellets were prepared having ½" diameter by hot pressing powdered material at about 325° C. for 15 minutes using about 20,000 pounds force. The pellets varied in thickness from about 1 to 3 mm. The heat treatment of these five pellets and the electrical testing thereof is reported in Table I which follows:

*Table I*

| Sample No. | Original sample weight, gms. | Heat treatment [1] | Percent weight loss | Resistivity ohm-cm. | TEP, V./°C. |
|---|---|---|---|---|---|
| 1 | 0.2520 | 1 hr. at 340° C | 12 | 3,700 | −18 |
| 2 | 0.1573 | 2½ hrs. at 422° C | 17 | 310 | −56 |
| 3 | 0.2025 | 14 hrs. at 450° C | 25 | 120 | −34 |
| 4 | 0.2652 | 4½ hrs. at 520° C | 26 | 74 | −15 |
| 5 | 0.1308 | 14 hrs. at 532° C | 28 | 49 | −7 |

[1] Each sample was subjected to the heat treatment indicated opposite the sample in addition to the heat treatments to which each sample above it in the table were subjected. Heat treatments were carried out with the samples under high vacuum of about 0.2 mm. of Hg absolute pressure.

An examination of the data in Table I indicates that as the severity and time of heat treatment is increased on the sample the resistivity of the sample is reduced; whereas, the thermoelectric power passes through a maximum afterwards decreasing. Resistivities reported in the table are measured at room temperature. Thermoelectric power and resistivity measurements were carried out in the same manner as described in Example 2.

EXAMPLE 4

This example describes the preparation and heat treatment of seven other pelleted samples of the reaction product of Example 1. The pellets varied in thickness from about 1 to 2 mm. The pellets were prepared in a manner similar to that described for the pellets of Example 3. The electrical test measurements were carried out in a similar manner to that described in Example 2. The results of these tests are reported in Table II as follows:

*Table II*

| Sample No. | Weight, gms. | Heat treatment | Cumulative percent weight loss | Resistivity, ohm-cm. | TEP V./°C. |
|---|---|---|---|---|---|
| 1 | 0.1877 | 4 hrs. at 350° C./0.25 mm | 8 | 17,000 | −2 |
| 2 | 0.1918 | 1 hr. at 375° C./0.25 mm | 10.4 | 4,200 | −16 |
| 3 | 0.1970 | 2 hrs. at 375° C./0.25 mm | 11.5 | 2,500 | −28 |
| 4 | 0.1888 | 3 hrs. at 375° C./0.25 mm | 12.5 | 1,800 | −21 |
| 5 | 0.1983 | 4 hrs. at 375° C./0.25 mm | 13.7 | 910 | −67 |
| 6 | 0.1978 | 5¼ hrs. at 375–400° C./0.25 mm | 15.0 | 640 | −48 |
| 7 | 0.1937 | 7¼ hrs. at 375–400° C./0.25 mm | 15.7 | 350 | −48 |
| 1 | (*) 0.1638 | Samples heated at 375–400° C./0.3 mm. for 3 hrs | 12.0 | | |
| 2 | 0.1692 | | 11.7 | | |
| 3 | 0.1718 | | 12.7 | | |
| 4 | 0.1628 | | 13.7 | 1,400 | −58 |
| 5 | 0.1680 | | 15.0 | 650 | −49 |
| 6 | 0.1630 | | 15.8 | 500 | −59 |
| 1 | 0.1555 | Samples heated at 400° C./0.2–0.3 mm. for 2 hrs | 17.2 | 420 | −77 |
| 2 | 0.1619 | | 15.6 | 400 | −81 |
| 3 | 0.1646 | | 16.4 | 430 | −77 |
| 1 | 0.1497 | Samples heated at 400° C./0.2–0.3 mm. for 3 hrs | 20.2 | 170 | −76 |
| 2 | 0.1559 | | 18.6 | 170 | −84 |
| 3 | 0.1593 | | 19.1 | 190 | −84 |
| 1 | 0.1488 | Samples heated at 400–420° C./0.2–0.3 mm. for 2½ hrs | 20.6 | 200 | −77 |
| 2 | 0.1544 | | 19.4 | 170 | −66 |
| 3 | 0.1570 | | 20.3 | 200 | −73 |
| 1 | 0.1466 | Samples heated at 430° C./0.2–0.3 mm. for 3 hrs | 21.9 | 160 | −73 |
| 2 | 0.1519 | | 20.8 | 140 | −69 |
| 3 | 0.1547 | | 21.4 | 160 | −70 |
| 1 | 0.1447 | Samples heated at 430° C./0.2–0.3 mm. for 4 hrs | 22.8 | 140 | −66 |
| 2 | 0.1502 | | 21.6 | 130 | −71 |
| 1 | 0.1435 | Samples heated at 530° C./0.2–0.3 mm. for 19 hrs | 23.4 | 140 | −56 |
| 2 | 0.1480 | | 22.8 | 130 | −57 |

*Weights of samples given above the asterisk are original sample weights before any heat treating; whereas, weights of samples given below the asterisk are weights after the indicated heat treatment.

FIGURE 1 broadly embodies a thermoelectric device which can be either a thermoelectric generator or a thermoelectric cooling device depending on the designation of certain of the components. For the thermoelectric generating device a body 11 in the form of an N-type wafer or disc of pyrolyzed pyromellitonitrile/hydrogen sulfide reaction product is used, and body 12 is a P-type wafer of pyrolyzed pyromellitonitrile/hydrogen sulfide reaction product or alternatively a P-type wafer of pyrolyzed pyromellitonitrile/methanol reaction product described in detail in copending application Serial No. 11,717, filed February 29, 1960. Electrodes leading from the tops of the discs 11 and 12 are numbered 19 and 20, and these electrodes can be copper, aluminum or other suitable conductors. Ohmic contact can be made between discs 11 and 12 and electrodes 19 and 20, respectively, by coating the upper surface of the discs with silver or other noble metal and soldering the electrodes thereto, with, e.g. a lead-tin eutectic alloy having some cadmium therein. The coating of silver, for example, can be applied to the top of the discs by evaporation of the silver on to the disc tops or alternatively with silver paint, which is commercially available. The other ends of the electrodes, 19 and 20 are then connected by soldering or other suitable mechanical means to cold junction body 21, which is a copper or aluminum rectangular plate. The hot junctions of the device consist of copper or aluminum bodies 13 and 14, which are suitably in the form of rectangular plates and are electrically connected to discs 11 and 12 in a similar manner as were electrodes 19 and 20.

Discs 11 and 12 can be enclosed in glass shells 27 and 28, which are sealed to the hot junction bodies 13 and 14 which are rectangular copper or aluminum plates by metal to glass seals 15 and 17. These metal seals for use in sealing metal to glass, i.e. making metal to glass junction seals, are well known and commercially available. Similar metal seals 16 and 18 are used to seal the glass envelope to electrodes 19 and 20. Glass seals such as have been proposed can be used where it is desirable to encapsulate the discs for one reason or another. Thus the discs 11 and 12 or one of them can be surrounded by any desired atmosphere, inert or otherwise, or by high vacuum, if desired.

If the device of FIGURE 1 is to be a thermoelectric generating device, elements 22 and 23 are some sort of heating source, such as a heating jacket, gas burners, etc. It is desirable although not mandatory that the cold junction 21 have the heat removed therefrom by a cooling jacket 30, which is attached to plate 21. Cooling fluid, for example, water is circulated through jacket 30 to remove the heat transmitted by the hot junctions to plate 21. Suitably also, plate 21 is cooled by forced drafts or air as by a fan blowing over the surface of plate 21. With such an arrangement as this, i.e., heated plates 13 and 14 and cooled plate 21, a thermoelectric current will be generated in discs 11 and 12, and if 26 is a load such as a radio receiver, a storage battery to be charged, a microswitch or other type of switch to be operated, or other electrical device, power will be provided to operate the electrical device. The positive and negative terminals of the device are indicated in FIGURE 1 at opposite ends of load 26. Voltage generated can be increased by connecting a number of such N-type and P-type bodies in series. For increased current flow, a number of the bodies are connected in parallel.

If instead of a load 26, a battery 26 or other direct current source of electricity is connected with positive and negative terminals as indicated in FIGURE 1, a thermoelectric cooling system results. In this system the cold junction will be plate 21 and the hot junctions plates 13 and 14. In a refrigerating apparatus, for example, or for that matter in other cooling devices, it is desirable for maximum heat removal from the hot junctions to add cooling fins to plates 13 and 14. Also, suitably heat transfer fins are added to plate 21 to absorb heat and transmit it to plate 21. For use in refrigeration cold junction 21 would, of course, be positioned within the compartment or area to be cooled, whereas the hot junctions would be positioned outside of the area being cooled. A number of the devices of FIGURE 1 could be electrically connected in parallel or in series as would be most appropriate to increase the cooling surface and capacity.

Figure 2:
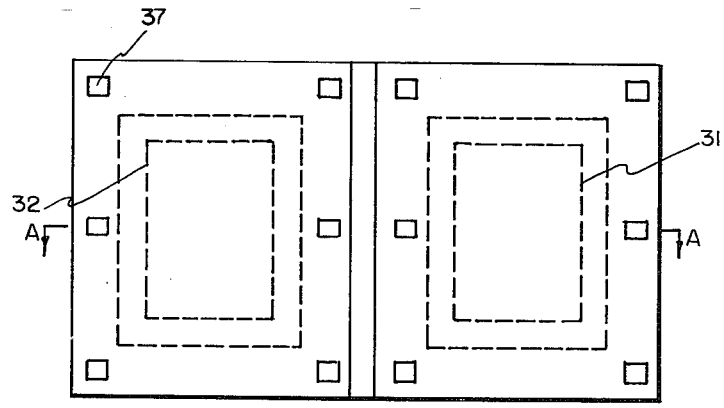
FIGURE 2 is a bottom view of another embodiment of the invention.
Figure 3:
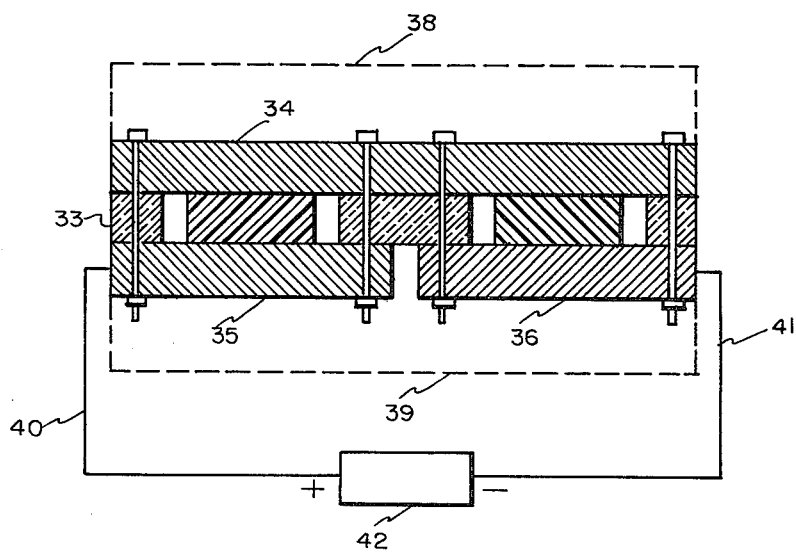
FIGURE 3 is an elevational view partially in section of the same embodiment as FIGURE 2.

FIGURES 2 and 3 show another embodiment of the invention. Bodies 31 and 32 suitably in the form of rectangular plates are P-type and N-type pyrolyzed pyromellitonitrile/hydrogen sulfide reaction product, respectively; however, alternatively, either of bodies 31 or 32 can be pyrolyzed pyromellitonitrile/methanol reaction products described in detail in copending application Serial No. 11,717, filed February 29, 1960. Body 34 suitably a copper or aluminum rectangular plate serves as the cold junction for the device, being bonded to plates 31 and 32 in a similar manner to that described in FIGURE 1. The hot junction bodies 35 and 36 suitable copper or aluminum plates are in a like fashion electrically connected to discs 31 and 32 to form ohmic junctions therewith. Gasket 33 is normally preferably made of an inorganic material such as glass, mica, or other materials which will withstand high temperatures, if the thermoelectric device is to be subjected to high temperature. If the device is not to be subjected to high temperatures, rubber or other similar gaskets can be used. Gasket 33 serves as an insulating separator between plates 34 and 35 and 36, and also serves to enclose on the sides thermoelectric discs 31 and 32. Thus with the metal plates 34, 35 and 36, and the gasket 33, plates 31 and 32 are encapsulated in separate compartments surrounded on the sides by vapor spaces. To prevent electrical short-circuiting of the device bolts and nuts 37 must be insulated from metal plates 34, 35 and 36 by electrical insulating washers and sleeves made of conventional materials such as rubber or inorganic materials described above, if the device is to be used at high temperatures.

As in FIGURE 1, if the device is a thermoelectric generator, it is necessary to have a heating means 39 which can be the same as described in FIGURE 1 for heating hot junctions which are plates 35 and 36, and it is desirable for maximum efficiency although not mandatory that cold junction plate 34 be cooled by conventional means 38 such as are described with respect to FIGURE 1. Leads 40 and 41 connect electrically hot junction plates 35 and 36 with a load 42, which can suitably be the same type of load as employed in the thermoelectric generator of FIGURE 1.

If the device of FIGURES 2 and 3 is used as a thermoelectric cooling device, it is desirable to attach fins to hot junctions 35 and 36. It is also desirable to employ a blower or other cooling device 39 for the purpose of aiding the removal of heat from the hot junctions. Likewise it is desirable to employ cooling fins attached to cold junction 34 for gathering heat from the enclosure which is being cooled and conducting it to the cold junction. A D.C. voltage source 42 such as a battery is connected in the circuit as indicated by the plus and minus terminals on FIGURE 3 to serve as the source of power to operate the cooling device.

As in the case of the device of FIGURE 1 whether used for electrical power generation or cooling, a number of the devices of FIGURES 2 and 3 can suitably be electrically connected in parallel or series.

If the thermoelectric discs are not enclosed in housings such as in FIGURE 1 and FIGURES 2 and 3, it will be desirable in some cases to encapsulate the discs except at the electrode connections, for example, by covering the discs with a protective film of silicone varnish, glass, plastic resin, etc.

In the devices of FIGURES 1-3, either the N-type bodies or the P-type body of pyrolyzed pyromellitonitrile/hydrogen sulfide reaction product can be replaced by another N-type or P-type body, e.g. N-type bismuth telluride or P-type bismuth telluride could be used. Other N-type or P-type thermoelectric bodies either organic or inorganic can be used in conjunction with a P-type or an N-type body of pyrolyzed pyromellitonitrile/hydrogen sulfide reaction product.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A thermoelectric device comprising an N-type thermoelectric element and a P-type thermoelectric element with electrical connections joining said elements and other electrical connections to said elements, provided at least one of said elements is made by the process comprising: (1) mixing pyromellitonitrile and hydrogen sulfide to form a reaction product having substantially 2 moles of hydrogen sulfide per mole of pyromellitonitrile, (2) separating said reaction product from the reaction mixture, (3) forming an element under pressure from said separated reaction product, and (4) heating said formed element at a temperature in the range of about 180°–700° C. for a time sufficient to produce the desired thermoelectric element.

2. The device of claim 1 wherein the heating of said formed element is carried out in an inert atmosphere.

3. The device of claim 2 wherein the mixing of the pyromellitonitrile and hydrogen sulfide was carried out in the presence of ammonium hydroxide.

4. A thermoelectric cooling device comprising an N-type element and a P-type element, electrical connections joining said elements, and other electrical connections for joining said elements through a direct current source with the positive terminal of said source to be connected to said N-type element and the negative terminal of said source to be connected to said P-type element, provided at least one of said elements is made by the process comprising: (1) mixing pyromellitonitrile and hydrogen sulfide to form a reaction product having substantially 2 moles of hydrogen sulfide per mole of pyromellitonitrile, (2) separating said reaction product from the reaction mixture, (3) forming an element under pressure from said separated reaction product, and (4) heating said formed element at a temperature in the range of about 180°–700° C. for a time sufficient to produce the desired thermoelectric element.

5. The device of claim 4, wherein a metal element for heat transfer electrically joins said N- and P-type elements, and other metal elements for heat transfer are to be connected in series electrically between said N- and P-type elements and said direct current source.

6. The device of claim 4, wherein both of said N- and P-type elements are made by said process.

7. A thermoelectric generating device comprising an N-type element and a P-type element, electrical connections joining said elements, other electrical connections for joining said elements through an electrical load and means for associating a heating source with a pair of the portions of said elements, provided at least one of said elements is made by the process comprising: (1) mixing pyromellitonitrile and hydrogen sulfide to form a reaction product having substantially 2 moles of hydrogen sulfide per mole of pyromellitonitrile, (2) separating said reaction product from the reaction mixture, (3) forming an element under pressure from said separated reaction product, and (4) heating said formed element at a temperature in the range of about 180°–700° C. for a time sufficient to produce the desired thermoelectric element.

8. The device of claim 7, wherein said heating source is to be associated with the pair of connected portions of said elements to be connected with said load.

9. The device of claim 8, wherein means is provided for associating a cooling source with the pair of portions of said elements connected directly together electrically.

10. The device of claim 8, wherein a metal element for heat transfer directly joins electrically the N- and P-type elements, and metal bodies for heat transfer are provided to be connected in series electrically between said N- and P-type elements and said load.

11. The device of claim 8, wherein both of said N- and P-type elements are made by said process.

References Cited in the file of this patent

Eley: Organic Semiconductors, Research (London), volume 12, 1959, pages 293–299.

UNITED STATES PATENT OFFICE
CERTIFICATE OF CORRECTION

Patent No. 3,046,322                       July 24, 1962

Bernard S. Wildi

It is hereby certified that error appears in the above numbered patent requiring correction and that the said Letters Patent should read as corrected below.

Columns 3 and 4, Table II, last line, for "530° C." read -- 430° C. --.

Signed and sealed this 11th day of December 1962.

(SEAL)
Attest:

ERNEST W. SWIDER
Attesting Officer

DAVID L. LADD
Commissioner of Patents